Patented Apr. 4, 1950

2,503,104

UNITED STATES PATENT OFFICE 2,503,104

PROCESS FOR PRECIPITATING SILVER FROM SOLUTIONS

Eduard Farber, Washington, D. C., assignor to Timber Engineering Company, Washington, D. C., a corporation of Delaware No Drawing. Application May 13, 1946, Serial No. 669,446

6 Claims. (Cl. 75—108)

This invention relates to a process for recovering silver from extremely dilute solutions of silver salts, and more particularly of complex silver salts and compounds such as are present in spent photographic solutions.

The present process broadly contemplates contacting the silver salt-containing solution with a reagent capable of removing the silver component from the solution, preferably by effecting precipitation thereof.

Most of the metallic silver contained in spent photographic solutions is present in the form of complex salts. It has been observed that on addition of solutions of chloride ions to the solutions of such complex silver salts, no appreciable amount of silver can be precipitated directly therefrom. The sulfide of silver can, however, be more readily obtained.

It has been observed that the silver sulfide tends to form colloidal suspensions so that separation is slow, and furthermore it is uncertain as to completeness.

It has also been observed that precipitation of the silver from a spent photographic solution can be effected by (a) heating the spent photographic solution to near its boiling point, (b) rendering it alkaline by the addition of sodium hydroxide, and (c) facilitating the reduction of the silver by organic reducing agents.

In the cases of all known reducing agents tested, however, there exist serious drawbacks. For example, when formic acid is employed as a reducing agent, relatively small quantities thereof will produce a quick settling precipitate from an alkaline solution but the precipitate contains only a portion of the silver present in the solution. If, on the other hand, larger amounts of formic acid are employed, no precipitation will occur.

Sodium lactate has been found to cause only a partial reduction of the silver content of the solution, and even when the lactate is employed in large excess the reaction is very slow.

A process, in order to have commercial practicality, necessitates the rapid formation of a precipitate which can be settled out to a small volume within a matter of a few hours, and which precipitate will contain virtually all the silver originally present in the solution.

While glucose and other reducing sugars can be employed under conditions such that they will render all of the silver insoluble, their employment does not result in the formation of a settleable precipitate. A considerable part of the silver coats the heated walls of the reaction vessel, and this necessitates the resort to additional measures for recovering such silver.

I have now found that a substantially complete quick settling precipitation of the silver from spent photographic solutions can be effected by utilizing as a precipitant a hydrolyzed sugar solution obtained from wood. Such hydrolyzed sugar solutions contain not only the reducing sugars but also certain organic acids including uronic acid as well as the more easily hydrolyzed and solubilized part of the lignin content of the wood. The combination of these several substances produces a desired effect, probably as a result of a combination of chemical decomposition of the originally contained complex silver salt and an adsorption of the silver by the substances of high molecular weight, such as the easily hydrolyzed lignin.

Preferred methods of producing hydrolyzed sugar solutions suitable for use as precipitants in accordance with the present invention are as follows:

*Example I.*—Hard wood sawdust is heated with a dilute mineral acid to effect the hydrolysis of the hemi-cellulose, the mixture is then neutralized by means of sodium carbonate, and the solution separated from the wood residue. For example, 1 kilogram of oak sawdust on a dry basis is mixed with 8 kilograms of water containing sulfuric acid at a concentration of 4%. The mixture is heated for several hours to a temperature near the boiling point, and at the conclusion of such heating the mixture is neutralized by the addition of sodium carbonate, following which the same is filtered. The solution thus recovered may be mixed with water up to say 10 liters to provide a solution ready for use. If the product is to be transported, it may be concentrated to a volume convenient for shipping, and later diluted at the point of use.

*Example II.*—Soft wood wastes are hydrolyzed by heating with dilute sulfuric acid to produce the dilute solution of the main parts of the carbohydrates. This solution of hydrolyzed wood carbohydrates is then subjected to fermentation as, for instance by Saccharomyces. The products of the fermentation are removed as by distillation in the case of alcohol, or by gravity separation in the case of yeast. The solution separated by one of these processes contains the hydrolyzed sugars mainly of the pentose type, and in addition other wood extractives like organic acids and derivatives of soluble lignins. This wood sugar residue can be concentrated and used for the precipitation after treatment with alkali to bring the solution to at least pH 9.

Coming now to the method of treating a spent photographic solution to recover the silver content thereof, it has been found that usually the spent photographic solution requires an amount of the hydrolyzed sugar solution which contains a weight of wood extractives approximately equal to the weight of the silver component of the photographic solution treated. The hydrolyzed sugar solution containing wood extractives produced from 1 kilogram of oak sawdust has been found to contain about 0.2 kilogram of wood extractives, so that a solution containing this amount of wood extractives is sufficient for precipitating the silver out of 100 liters of spent photographic solution containing 0.2% silver.

In carrying out the precipitation process, it is preferable to heat the photographic solution to a temperature near the boiling point thereof, and to then add the hydrolyzed sugar solution containing wood extractives thereto. Usually a fine precipitate will form soon after mixing the two solutions together. This fine precipitate does not, however, contain any very appreciable amount of the silver. It has been found necessary to adjust the alkalinity of the mixed solution to a pH of at least 9 in order to cause the silver component to precipitate. In a few minutes after the adjustment of the pH of the mixture to approximately pH 9, the precipitate begins to settle out. After about 1 hour, the volume of the precipitate will be found to correspond to about 10% of the total solution volume. After several hours, this proportion will be reduced to below 5%. The supernatant liquor, although slightly turbid, does not contain any appreciable amount of silver in any form. The supernatant liquor can be easily clarified by the addition thereto of a solution of an iron salt containing, for example, 5 grams of ferric sulfate for 100 liters of the turbid solution.

In the production of the precipitate amounting to only 5% of the volume of the original silver-containing solution, it will be observed that the silver has been concentrated at least 20 times and, therefore, in the foregoing examples, the precipitated sludge contains approximately 4% silver. This concentration can be further increased by pressing off the water contained in sludge. Normally, sufficient water can be removed from the sludge to bring the silver concentration therein to about 10%. It is then possible to burn the organic material out of the sludge mixture and obtain the silver in the form of a metallic residue which may be readily purified by washing with dilute mineral acids, which do not attack the silver, or it may be recovered by other known metal refining means.

As an indication of the efficacy of the present invention, it may be stated that while in the foregoing illustrative treatment about 200 grams of the wood extractives found in hydrolyzed sugar solutions are sufficient to effect precipitation of the silver from the photographic solution, it has been found that 1200 grams of sodium lactate will not completely remove the silver from the same quantity of a spent photographic solution. From this observation, it is reasonable to assume that, while lactic acid may be found among the products of the action between reducing sugar and an alkali, the intermediate strongly reactive products of this reaction are in all likelihood responsible for the improved effect.

While an illustrative procedure for obtaining the wood extractives found efficacious for the purposes of the present invention has been set forth above, it will be appreciated that the solution of such wood extractives may be prepared in any other equivalent manner. For example, one may vary the concentration of sulfuric acid in the solution mixed with the sawdust between the limits of 2 to 20% or, if desired, one may substitute hydrochloric acid for sulfuric acid, maintaining the concentration of the hydrochloric acid in the solution between approximately 1 and 10%. The limiting factor will be the known conditions under which at least a major part of the easily hydrolyzed hemi-celluloses of the wood will be carried into solution.

While in the illustrative procedure given, equal weights of wood extractives present in the hydrolyzed sugar solution and silver in the spent photographic solution is set forth as preferable, it will be appreciated that this ratio is optional and may be varied within reasonable limits so long as a sufficient quantity of the wood extractives is employed to effect complete precipitation of the silver. Generally speaking, the wood extractives employed should equal at least 50% of the weight of the silver component of the spent photographic solution, and should not generally exceed 200% of the weight of such silver components. When too small an amount of wood extractives is employed, incomplete silver precipitation is effected, whereas when too great a quantity of wood extractives is employed there is a tendency for the precipitate to come out in too fine distribution and to peptize in the salt solution. In all instances, reference is here had to the practice of the method employing heated silver containing solutions and an alkalinity adjusted to a pH of at least pH 9. When the process is carried out without heating the silver-containing solution, it is preferable to use a substantial excess of the wood extractives, and it will be found advantageous to allow at least a 24 hour period for the reaction.

The precise mechanism responsible for the precipitation of the silver from dilute solutions from complex silver salts in accordance with the present invention is not fully understood. While it is known that wood may be partially hydrolyzed with dilute acids, usually in such procedures the separation between the sugar solution and the wood residue does not embrace a step of preliminary neutralization.

It has been found that the neutralization of the acid hydrolyzate, while still mixed with the residual wood, yields a most effective precipitant for employment in accordance with the present invention. This may be in part due to the fact that the neutral or slightly alkaline solution contains lignin-like substances which would not normally dissolve without neutralization of the original acid. An alternative procedure embraces the separation of the hydrolyzed wood sugar solution from the wood residue, followed by an alkali extraction of the wood residue and a blending of the resultant extraction.

While in the foregoing specification reference has been primarily made to wood, it will be appreciated that wood is set forth as representative of cellulose materials which contain hemi-celluloses and lignin. It will be understood that while the method has been described particularly in its application to spent photographic solutions, these are only examples of spent solutions containing low concentrations of silver for which the process and precipitant can be generally used.

What I claim is:

1. A process for recovering silver from dilute solutions of its complex salts comprising effecting precipitation of the silver by incorporating in the dilute solution a precipitant solution produced by subjecting comminuted wood to the action of a dilute mineral acid under conditions requisite to effect hydrolysis of the hemi-cellulose, followed by alkalizing the mixture and separating the said precipitant solution from the wood residue, and separating the silver precipitated from the mixture of dilute solution and precipitant solution.

2. A process for recovering silver from dilute solutions of its complex salts comprising effecting precipitation of the silver by incorporating in the dilute solution a precipitant solution produced by hydrolyzing wood wastes with dilute mineral acid to form a dilute solution of carbohydrates, fermenting the carbohydrate solution, separating products of fermentation to leave wood sugar residue containing wood extractives, and separating the silver precipitated from the mixture of dilute solution and precipitant solution.

3. A process for recovering silver from dilute solutions thereof which comprises incorporating in the dilute solutions a precipitant produced by subjecting cellulosic substances containing hemicellulose and lignin to the action of a dilute mineral acid under conditions requisite to effect hydrolysis of the hemicellulose, adjusting the pH of the mixture of silver solution and precipitant to at least about 9, and recovering the silver precipitated from the mixed solutions.

4. A process for recovering silver from dilute solutions thereof which comprises precipitating the silver from said solutions by incorporating in the dilute solutions a precipitant solution produced by subjecting cellulosic substances containing hemicellulose and lignin to the action of a dilute mineral acid under conditions requisite to effect hydrolysis of the hemicellulose, followed by alkalizing the mixture and separating the said precipitant solution from the insoluble residue, and separating the silver precipitated from the mixture of dilute solution and precipitant solution.

5. A process for recovering silver from dilute solutions of its complex salts comprising effecting precipitation of the silver by incorporating in the dilute solution a precipitant solution produced by subjecting comminuted wood to the action of a dilute mineral acid under conditions requisite to effect hydrolysis of the hemicellulose, followed by alkalizing the mixture and separating the said precipitant solution from the wood residue, adjusting the pH of the mixture of silver solution and precipitant solution to at least about 9, and then separating the silver precipitated from the mixed solutions.

6. A process for recovering silver from dilute solutions of its complex salts comprising effecting precipitation of the silver by incorporating in the dilute solution a precipitant solution produced by subjecting comminuted wood to the action of a dilute mineral acid under conditions requisite to effect hydrolysis of the hemicellulose, separating the wood residue from the acid solution, extracting the separated wood residue with a solution of alkali, and combining the acid and alkali solutions to form the precipitant solution, adjusting the pH of the mixture of silver solution and precipitant solution to at least about 9, and then separating the silver precipitated from the mixed solutions.

EDUARD FARBER.

REFERENCES CITED

The following references are of record in the file of this patent:

UNITED STATES PATENTS

| Number | Name | Date |
| --- | --- | --- |
| 224,902 | Johnson | July 26, 1881 |
| 1,448,475 | Weisberg | Mar. 13, 1923 |

FOREIGN PATENTS

| Number | Country | Date |
| --- | --- | --- |
| 211,005 | Great Britain | Feb. 14, 1924 |
| 523,190 | Great Britain | July 8, 1940 |

OTHER REFERENCES

"Industrial and Engineering Chemistry," January 1945, vol. 37, pages 70–73.